(12) United States Patent
Gillingwater (10) Patent No.: US 9,144,933 B2
(45) Date of Patent: Sep. 29, 2015

(54) RECEPTACLE FOR ATTACHING TO A PRODUCT HAVING A CURVED WALL

(76) Inventor: James D. Gillingwater, Quesnel (CA)

(*) Notice: Subject to any disclaimer, the term of this patent is extended or adjusted under 35 U.S.C. 154(b) by 811 days.

(21) Appl. No.: 13/014,649

(22) Filed: Jan. 26, 2011

(65) Prior Publication Data

US 2012/0187008 A1    Jul. 26, 2012

(51) Int. Cl.
| | |
|---|---|
| B65D 1/04 | (2006.01) |
| B65D 1/40 | (2006.01) |
| B29C 49/54 | (2006.01) |
| B65D 23/00 | (2006.01) |
| B65D 23/12 | (2006.01) |

(Continued)

(52) U.S. Cl.
CPC ............... B29C 49/54 (2013.01); B65D 23/00 (2013.01); B65D 23/12 (2013.01); B65D 23/14 (2013.01); *B29C 2791/001* (2013.01); *B29L 2031/7126* (2013.01); *B29L 2031/7158* (2013.01)

(58) Field of Classification Search
CPC ....... B65D 23/12; B65D 21/0237; B65D 1/04
USPC .............. 206/217, 218, 229, 528–540; 215/6, 215/389–391, DIG. 3, DIG. 7, 2, 12.1, 12.2, 215/13.1, 306, 379, 380, 385–387, DIG. 8; 220/23.2, 23.4, 23.83, 61, 523, 524, 220/676, 678, 680, 697, 702–719, 735, 744, 220/23.86, 213, 379, 476, 477, 480, 500, 220/503–505, 526–528, 575, 654, 220/661–665; 222/192, 246, 288; 604/78; 99/317–322; D7/507, 513; D32/54–56
See application file for complete search history.

(56) References Cited

U.S. PATENT DOCUMENTS

| 129,451 | A | * | 7/1872 | Baldwin | 47/79 |
| 180,132 | A | * | 7/1876 | Hoard | 215/6 |
| 291,771 | A | * | 1/1884 | Rasgorshek | 220/246 |

(Continued)

FOREIGN PATENT DOCUMENTS

| DE | 19609972 A1 * | 6/1997 |
| DE | 10054903 A1 | 5/2002 |

(Continued)

OTHER PUBLICATIONS

English Translation of German Patent Publication No. DE 10054903A1.

(Continued)

*Primary Examiner* — Anthony Stashick
*Assistant Examiner* — Ned A Walker
(74) *Attorney, Agent, or Firm* — Cameron IP (57) ABSTRACT

There is provided a receptacle for connecting to a curved wall of a container. The receptacle has a pair of spaced-apart flanges that extend about the container. The receptacle includes an outer wall member configured to be spaced-apart from the curved wall of the container. The receptacle includes an open back opposite the outer wall member of the receptacle. The receptacle includes a pair of spaced-apart ends that connect the flanges of the receptacle to the outer wall member of the receptacle. The receptacle includes a bottom that connects to and extends between the ends of the receptacle. The bottom of the receptacle has an outer edge connecting with the outer wall member of the receptacle. The bottom of the receptacle has a curved inner edge configured to abut with and partially extend about the container.

9 Claims, 5 Drawing Sheets

(51) Int. Cl.
B65D 23/14  (2006.01)
B29L 31/00  (2006.01)

(56) References Cited

U.S. PATENT DOCUMENTS

| | | | | |
|---|---|---|---|---|
| 442,698 | A | * | 12/1890 | Yates .............................. 604/57 |
| 605,213 | A | | 6/1898 | Weller |
| 624,701 | A | | 5/1899 | Stevenson |
| 1,264,539 | A | * | 4/1918 | Magel ............................ 604/78 |
| 1,275,467 | A | * | 8/1918 | Poulalion ....................... 604/78 |
| 1,276,018 | A | * | 8/1918 | Blaetus ......................... 220/735 |
| 1,420,297 | A | * | 6/1922 | Thompson .................... 215/391 |
| 1,496,346 | A | * | 6/1924 | Lindmark ...................... 248/111 |
| 1,644,612 | A | * | 10/1927 | Roberts ...................... 220/23.83 |
| 1,993,978 | A | * | 3/1935 | Plochman ........................ 215/6 |
| 2,002,677 | A | * | 5/1935 | Robinson ..................... 222/108 |
| 2,149,612 | A | * | 3/1939 | Madsen ........................ 206/229 |
| 2,259,927 | A | * | 10/1941 | Dunton ........................ 220/736 |
| 2,274,973 | A | | 3/1942 | Bryant |
| 2,314,835 | A | * | 3/1943 | Johns et al. .................. 220/23.4 |
| 2,602,309 | A | * | 7/1952 | Doyle ......................... 220/23.83 |
| 2,613,517 | A | * | 10/1952 | Frantz .......................... 220/23.2 |
| 2,646,200 | A | * | 7/1953 | Atkins ...................... 229/125.04 |
| 2,656,837 | A | * | 10/1953 | Bryan ............................ 604/78 |
| 2,744,649 | A | | 5/1956 | Smith |
| 2,825,085 | A | * | 3/1958 | Ingraham ....................... 401/19 |
| 2,940,447 | A | * | 6/1960 | Zanegood ....................... 604/78 |
| 3,015,408 | A | * | 1/1962 | Campbell et al. ............... 220/3.4 |
| 3,331,369 | A | * | 7/1967 | Keck .............................. 604/78 |
| 3,407,429 | A | * | 10/1968 | Di Nardo .................... 15/257.01 |
| 3,526,313 | A | | 9/1970 | Kull et al. |
| 3,657,994 | A | * | 4/1972 | Post ................................. 99/323 |
| 3,688,943 | A | * | 9/1972 | Brown .......................... 220/697 |
| 3,698,551 | A | * | 10/1972 | Tomlinson ................... 206/489 |
| 3,732,999 | A | | 5/1973 | Rounkles |
| 3,754,502 | A | * | 8/1973 | Kaufman ....................... 100/133 |
| D235,182 | S | * | 5/1975 | Capron ........................... D7/598 |
| 3,936,087 | A | * | 2/1976 | Alexander ...................... 248/99 |
| 4,022,060 | A | * | 5/1977 | Rebhan ......................... 374/150 |
| 4,036,463 | A | * | 7/1977 | Hopkins et al. ............... 248/210 |
| 4,257,525 | A | * | 3/1981 | Thompson .................... 215/396 |
| 4,491,234 | A | * | 1/1985 | Wilcock ........................ 220/697 |
| D282,615 | S | * | 2/1986 | Levine ........................... D7/513 |
| D283,386 | S | * | 4/1986 | Mansueto ....................... D7/513 |
| D283,476 | S | * | 4/1986 | Mansueto ....................... D7/513 |
| 4,583,666 | A | * | 4/1986 | Buck ............................. 222/109 |
| 4,620,631 | A | | 11/1986 | Bartelt |
| D295,009 | S | * | 4/1988 | Mansueto ....................... D7/513 |
| D300,970 | S | * | 5/1989 | Walker ........................... D32/54 |
| D301,688 | S | * | 6/1989 | Green ............................ D9/741 |
| 4,844,281 | A | * | 7/1989 | Bradford ...................... 220/697 |
| 4,867,332 | A | * | 9/1989 | Mains ........................... 220/735 |
| 4,892,207 | A | * | 1/1990 | Cullis ........................... 215/398 |
| 4,914,258 | A | * | 4/1990 | Jackson ....................... 174/45 R |
| D307,651 | S | * | 5/1990 | Dooley et al. ................. D29/129 |
| D310,958 | S | * | 10/1990 | Biesecker ....................... D9/744 |
| 4,964,522 | A | * | 10/1990 | Umetsu et al. ............... 215/398 |
| 5,029,700 | A | * | 7/1991 | Chen ............................ 206/217 |
| 5,042,659 | A | * | 8/1991 | Morita ....................... 206/387.1 |
| 5,050,757 | A | * | 9/1991 | Hidding et al. ............. 220/23.83 |
| 5,065,875 | A | * | 11/1991 | Balavich ......................... 215/10 |
| 5,076,519 | A | * | 12/1991 | Panovic ........................ 248/110 |
| D327,148 | S | * | 6/1992 | Alessi ............................ D32/54 |
| 5,135,116 | A | * | 8/1992 | Panzetti ......................... 215/10 |
| 5,234,735 | A | * | 8/1993 | Baker et al. .................. 428/41.7 |
| D341,686 | S | * | 11/1993 | Panovic ......................... D32/54 |
| 5,261,577 | A | * | 11/1993 | Goldstein et al. ............. 220/697 |
| D344,616 | S | * | 2/1994 | Berfield et al. ................ D32/31 |
| 5,297,695 | A | * | 3/1994 | Provence ...................... 220/697 |
| 5,322,183 | A | * | 6/1994 | Strachan ...................... 220/697 |
| 5,379,886 | A | * | 1/1995 | Brauner et al. ............... 206/216 |
| 5,469,612 | A | * | 11/1995 | Collette et al. .................. 29/453 |
| 5,482,095 | A | | 1/1996 | de Chollet |
| 5,483,019 | A | * | 1/1996 | Tourigny ..................... 174/45 R |
| D370,412 | S | * | 6/1996 | Rohrer ........................... D9/761 |
| 5,533,881 | A | * | 7/1996 | Collette et al. ................ 425/525 |
| 5,553,730 | A | * | 9/1996 | Kohnen ......................... 220/3.2 |
| 5,560,506 | A | * | 10/1996 | Yanagisawa et al. ......... 215/398 |
| 5,637,167 | A | * | 6/1997 | Krishnakumar et al. ........ 156/85 |
| 5,641,007 | A | * | 6/1997 | Falk .............................. 141/106 |
| 5,641,939 | A | * | 6/1997 | Tourigny .................... 174/45 R |
| D385,184 | S | * | 10/1997 | Binter ........................... D9/743 |
| 5,699,937 | A | * | 12/1997 | Canela .......................... 222/129 |
| D389,700 | S | * | 1/1998 | Bingham ....................... D7/509 |
| 5,715,969 | A | | 2/1998 | Seerup et al. |
| 5,735,422 | A | * | 4/1998 | Binter ......................... 220/4.21 |
| 5,803,306 | A | * | 9/1998 | Lewis ........................... 220/662 |
| 5,819,966 | A | * | 10/1998 | Ota et al. ...................... 215/398 |
| D404,241 | S | * | 1/1999 | Bagley .......................... D7/513 |
| D405,574 | S | * | 2/1999 | Riky ............................. D32/54 |
| 5,906,287 | A | * | 5/1999 | Kohnen ......................... 220/3.2 |
| 5,913,966 | A | * | 6/1999 | Arnone et al. .................. 99/413 |
| 5,954,213 | A | * | 9/1999 | Gerhart et al. ................. 215/10 |
| 5,971,201 | A | * | 10/1999 | Daw ............................. 220/697 |
| 6,024,253 | A | | 2/2000 | Doctor |
| 6,064,005 | A | * | 5/2000 | Raasch .......................... 174/66 |
| 6,098,794 | A | * | 8/2000 | Lin .............................. 206/217 |
| 6,098,825 | A | * | 8/2000 | Kohnen ......................... 220/3.2 |
| 6,118,074 | A | * | 9/2000 | Turcovsky et al. ............. 174/66 |
| D431,363 | S | * | 10/2000 | Boyette et al. ................ D3/315 |
| 6,303,863 | B1 | * | 10/2001 | Raasch .......................... 174/66 |
| 6,446,829 | B1 | * | 9/2002 | Malvasio et al. ............. 220/697 |
| 6,497,081 | B1 | * | 12/2002 | Raasch .......................... 220/3.8 |
| 6,502,713 | B1 | * | 1/2003 | Baker ........................... 220/523 |
| 6,503,222 | B2 | * | 1/2003 | Lo ................................. 604/77 |
| 6,688,935 | B1 | * | 2/2004 | Lin ................................ 446/15 |
| 6,786,345 | B2 | * | 9/2004 | Richards ..................... 215/11.5 |
| 6,823,988 | B2 | * | 11/2004 | Ryan et al. .................... 206/216 |
| 6,981,962 | B1 | * | 1/2006 | Lenkersdorf ................... 604/78 |
| 7,147,101 | B2 | * | 12/2006 | Ryan et al. .................... 206/216 |
| 7,156,352 | B2 | | 1/2007 | Cudney |
| 7,178,533 | B2 | | 2/2007 | Andrion |
| D541,175 | S | * | 4/2007 | Burns et al. .................... D9/743 |
| 7,225,937 | B2 | | 6/2007 | Schroeder |
| 7,451,720 | B2 | * | 11/2008 | Somers ......................... 116/173 |
| D586,969 | S | * | 2/2009 | Graham ........................ D32/54 |
| 7,500,579 | B2 | * | 3/2009 | Crossley ....................... 220/703 |
| D595,580 | S | * | 7/2009 | Cordero et al. ............... D9/516 |
| 7,717,055 | B2 | * | 5/2010 | Somers ......................... 116/173 |
| 7,845,145 | B2 | * | 12/2010 | Schroeder ...................... 53/396 |
| D632,802 | S | * | 2/2011 | Salinas et al. ................ D24/224 |
| 8,033,409 | B2 | * | 10/2011 | Lindemann ................ 220/4.21 |
| 8,136,694 | B1 | * | 3/2012 | Vieau et al. ................... 220/735 |
| 2001/0052522 | A1 | * | 12/2001 | Forest ...................... 220/495.07 |
| 2002/0104815 | A1 | * | 8/2002 | Richards ..................... 215/11.1 |
| 2003/0168474 | A1 | * | 9/2003 | Widgery ...................... 222/183 |
| 2004/0004829 | A1 | * | 1/2004 | Policappelli .................. 362/101 |
| 2004/0140286 | A1 | * | 7/2004 | Zoller ........................... 215/379 |
| 2004/0226904 | A1 | * | 11/2004 | Schroeder ......................... 215/6 |
| 2004/0262316 | A1 | * | 12/2004 | Diep ....................... 220/495.06 |
| 2005/0024858 | A1 | * | 2/2005 | Johnson ........................ 362/154 |
| 2005/0067414 | A1 | * | 3/2005 | Lipson ...................... 220/23.86 |
| 2005/0081879 | A1 | * | 4/2005 | Andrion ....................... 132/308 |
| 2005/0284867 | A1 | * | 12/2005 | Sander et al. .............. 220/23.86 |
| 2006/0021989 | A1 | * | 2/2006 | Friedman ..................... 220/703 |
| 2006/0021990 | A1 | * | 2/2006 | Friedman ..................... 220/703 |
| 2006/0049066 | A1 | * | 3/2006 | Wang ........................... 206/217 |
| 2006/0131188 | A1 | * | 6/2006 | Lindemann .................. 206/217 |
| 2006/0175336 | A1 | * | 8/2006 | Wang ...................... 220/495.04 |
| 2006/0261072 | A1 | * | 11/2006 | Diep ....................... 220/495.07 |
| 2007/0026112 | A1 | * | 2/2007 | Zimmerman et al. ......... 426/106 |
| 2007/0068949 | A1 | * | 3/2007 | Crossley ....................... 220/503 |
| 2007/0193913 | A1 | * | 8/2007 | Schroeder .................... 206/503 |
| 2008/0035496 | A1 | * | 2/2008 | Lindemann .................. 206/217 |
| 2008/0264940 | A1 | | 10/2008 | Crooks |
| 2008/0302803 | A1 | | 12/2008 | Yacko et al. |
| 2009/0008270 | A1 | * | 1/2009 | Jones ............................. 206/37 |
| 2009/0045192 | A1 | | 2/2009 | Woolf |
| 2009/0134111 | A1 | | 5/2009 | Schroeder |
| 2009/0159614 | A1 | | 6/2009 | Yacko et al. |
| 2009/0314788 | A1 | * | 12/2009 | Douglas ....................... 220/697 |

(56) References Cited

U.S. PATENT DOCUMENTS

| | | | |
|---|---|---|---|
| 2011/0286782 A1* | 11/2011 | Castellani et al. | 401/125 |
| 2012/0012551 A1* | 1/2012 | Sinacori et al. | 215/12.1 |

FOREIGN PATENT DOCUMENTS

| | | | |
|---|---|---|---|
| EP | 1505003 A2 * | 2/2005 | |
| EP | 1529730 A1 | 5/2005 | |
| FR | 2217225 | 9/1974 | |
| FR | 2217225 A * | 10/1974 | |
| GB | 261661 | 11/1926 | |
| GB | 2392898 A | 3/2004 | |
| GB | 2485347 A * | 5/2012 | |
| WO | WO 01/44062 | 6/2001 | |
| WO | WO 2004/048216 | 6/2004 | |
| WO | WO 2004048216 A1 * | 6/2004 | |
| WO | WO 2006/120236 A1 | 5/2006 | |
| WO | WO 2009103140 A2 * | 8/2009 | |

OTHER PUBLICATIONS

English Translation of European Patent Publicaiton No. EP 1529730 A1.

Print out of a blow-molding process, Encyclopaedia Britannica, Inc., 1997.

Web printout of Blow molding, from Wikipedia, the Free Encyclopedia, Jan. 21, 2011.

* cited by examiner

RECEPTACLE FOR ATTACHING TO A PRODUCT HAVING A CURVED WALL

FIELD OF THE INVENTION

The present invention relates to a receptacle. In particular, the invention relates to a receptacle for attaching to a product having a curved wall.

DESCRIPTION OF THE RELATED ART

It is known per se to provide a receptacle configured to attach to a premade product that is round.

For example U.S. Pat. No. 624,701 to Stevenson shows a label-holder for attaching to a bottle. However the holder is bulky, has a relatively large number of parts and thus may be relatively expensive to manufacture.

U.S. Pat. No. 7,156,352 to Cudney shows an accessory container attachment for a paint can. This container likewise has a relatively large number of parts. The container in Cudney also appears to be relatively bulky and thus may inhibit efficient shelf stacking of a plurality of said products with accessory containers attached thereto.

U.S. Pat. No. 5,482,095 to de Chollet shows a receptacle for attaching to a bottle where the receptacle is more compact. Thus a plurality of the bottles with receptacles attached may more readily stack together on shelves. However the compact, egg-like shape of the receptacle may nonetheless still protrude outwards in a relatively space-consuming manner. Also the egg-like shape of the receptacle appears to result in a receptacle with restricted storage space.

BRIEF SUMMARY OF INVENTION

The present invention provides a receptacle disclosed herein that overcomes the above disadvantages. It is an object of the present invention to provide an improved receptacle for attaching to a curved wall of a product.

There is accordingly provided a receptacle for connecting to a curved wall of a product. The receptacle has a pair of spaced-apart flanges configured to partially extend about the product. The receptacle includes an outer wall member configured to be spaced-apart from the curved wall of the product. A pair of spaced-apart ends connect the flanges to the outer wall member. The receptacle includes a bottom connecting to and extending between the ends. The bottom has an outer edge connecting to and extending in parallel with the outer wall member. The bottom has a curved inner edge configured to abut with and partially extend about the product.

There is also provided, in combination, a product having a curved wall and a receptacle for connecting to the curved wall of the product. The receptacle has a pair of spaced-apart flanges configured to partially extend about the product. Adhesive is disposed on the flanges so as to enable the flanges to selectively adhere to the product. The receptacle includes an outer wall member spaced-apart from and partially covering a portion of the curved wall of the product. The outer wall member is arc-shaped. A pair of spaced-apart ends extend radially outwards from the product. The ends connect the flanges to the outer wall member. The receptacle includes a bottom connecting to and extending between the ends. The bottom is arc-shaped with a curved outer edge connecting to and extending in parallel with the outer wall member. The bottom also has a curved inner edge spaced-apart from and extending in parallel with the curved outer edge. The curved inner edge of the bottom is configured to abut with and partially extend about the product.

There is further provided, in combination, a container having a curved wall, a pocket-like receptacle for connecting to the curved wall of the container and an object retained by the receptacle. The receptacle has a closed bottom and a top opposite the bottom. The receptacle has a pair of spaced-apart closed ends interposed between the bottom and the top. The receptacle includes a closed outer wall member extending between the ends. The receptacle has an open back opposite the outer wall member and facing the container. The object is retainable by the bottom of the receptacle, the ends of the receptacle, the outer wall member of the receptacle and a portion of the curved wall of the container aligned opposite the outer wall member.

There is yet further provided a method of forming a container having a receptacle via blow-moulding. The method includes the step of providing a mould having a contoured surface that is a mirror image of a container. The mould has a protrusion extending inwards so as to form an indentation in the container. The method includes the step of disposing a molten material via pressurized air into the contoured surface of the mould. The molten material forms the container including the indentation. The method includes the step of removing the container from the mould. The method includes the step of forming a receptacle for the container by connecting a portion of material across at least part of the indentation.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
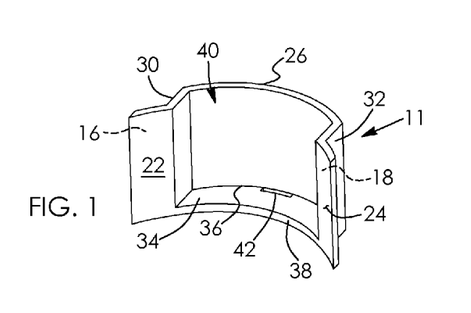
FIG. 1 is a top, rear perspective view of a receptacle according to one embodiment.
Figure 4:
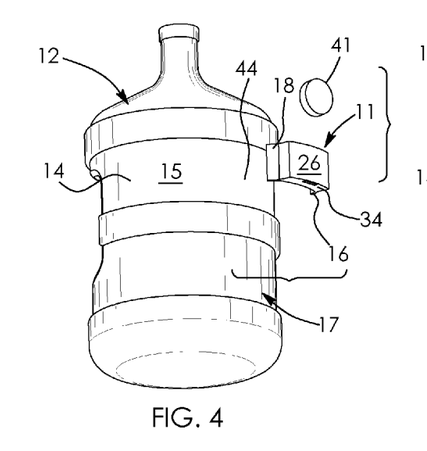
FIG. 4 is a bottom, front perspective view of the receptacle shown in FIG. 1 in the process of being attached to a convex, exterior surface of a product.
Figure 5:
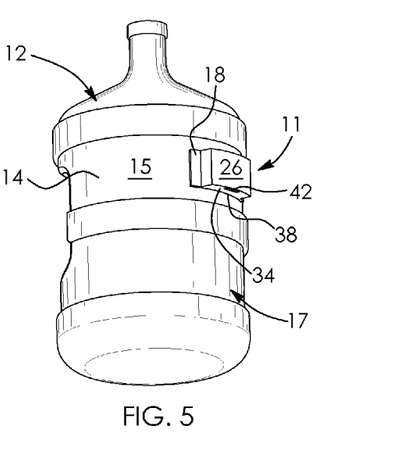
FIG. 5 is a bottom, front perspective view of the receptacle shown in FIG. 4 as attached to the product.

Referring to the drawings and first to FIG. 1, there is shown a receptacle 11 for attaching to a product having a convexly curved shape, in this example, the product being a container, in this case a standard round 5-gallon plastic water bottle 12 as shown in FIGS. 4 and 5. The bottle 12 has a curved wall 14 with a convex surface, in this example an exterior surface 15 on the exterior 17 of the bottle.

Figure 2:
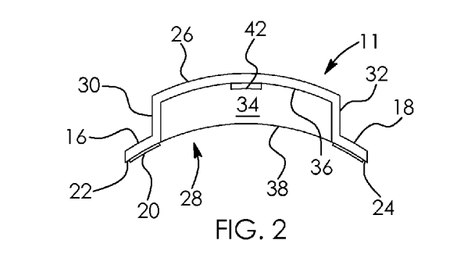
FIG. 2 is a top plan view of the receptacle shown in FIG. 1.
Figure 3:
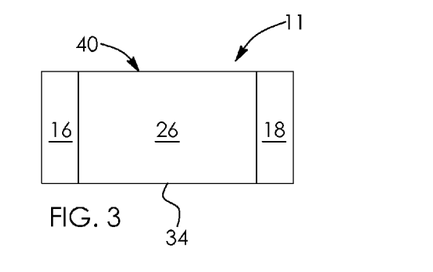
FIG. 3 is a front elevation view of the receptacle shown in FIG. 1.

Referring back to FIG. 1, the receptacle 11 includes a pair of spaced-apart flanges 16 and 18. The flanges are generally rectangular in shape and are configured to partially extend about the bottle. The receptacle 11 includes adhesive 20, as shown in FIG. 2, disposed on inner sides 22 and 24 of the flanges. The adhesive 20 is configured to enable the flanges to selectively adhere to the bottle.

The receptacle 11 has a closed, outer wall member 26 configured to be spaced-apart from the bottle. The outer wall member partially extends about the bottle. The outer wall member 26 is curved and in this example arc-shaped. Preferably the outer wall member 26 has a curvature that matches the curvature of the bottle. The outer wall member preferably is configured to extend parallel to the curved wall 14 of the bottle shown in FIGS. 4 and 5. The outer wall member is made of a resilient plastic in this example.

As shown in FIG. 2, the receptacle includes an open back 28 opposite the outer wall member 26.

The receptacle 11 has a pair of spaced-apart closed ends 30 and 32. The ends connect the flanges 16 and 18 to the outer wall member 26. In this example the ends 30 and 32 are configured to extend radially outwards from the bottle. As shown in FIG. 2, the ends 30 and 32 are interposed between the outer wall member 26 and the open back 28.

The receptacle 11 has a closed bottom 34. The bottom connects to and extends between the ends 30 and 32. The bottom 34 includes a curved, outer edge 36 that connects to and extends in parallel with the outer wall member 26. The bottom 34 also includes a curved, inner edge 38 configured to abut with and partially extend about the bottle 12 as shown in FIG. 5. According to one preferred embodiment, outer edge 36 and inner edge 38 have curvatures that match the curvature of the curved wall 14, and in this example exterior surface 15, of the bottle. The bottom 34 is thus generally arc-shaped.

Alternatively, the bottom 34 may made of a resilient material and thus need not match the curvature of the curved wall 14 of the bottle when the receptacle is removed from the bottle. The outer wall member 26 and the bottom 34 may be partially flexible and thus enable the inner edge 38 of the bottom 34 to fully abut with the bottle by forming a curvature matching that of the bottle thereby.

The receptacle 11 includes an open top 40 in this example as shown in FIG. 1 for receiving an object 41, as shown in FIG. 4. The top 40 is opposite the bottom 34. The ends 30 and 32 and outer wall member 26 extend from the bottom 26 to the top 40.

The receptacle 11 includes an aperture in this example a drain hole 42 extending through the bottom 34. The drain hole 42 is configured to enable water entering the receptacle, for example via open top 40, to drain. The drain hole 42 is centrally disposed relative to the ends 30 and 32. The drain hole 42 is in the form of a slit in this example that partially extends along the outer edge 36 of the bottom 26.

Referring to FIGS. 4 and 5, the receptacle 11 is configured to extend about and cover a portion 44 of the curved wall 14 (in this example of the exterior surface 15) aligned opposite to the outer wall member 26. Once flanges 16 and 18 are attached to the bottle 12 via adhesive 20, portion 44 of the curved wall effectively forms part of the receptacle 11. The receptacle 11 together with the bottle may thus be said to form a generally three-dimensional pocket-like shape. When one wants to place object 41 within the receptacle 11, the object 41 is retained by the bottom 34, the ends 30 and 32, the outer wall member 26 and the portion 44 of the curved wall 14 of the bottle 12.

Many advantages result from the structure of the present invention. The receptacle 11 with its structure, as herein described, may be said to represent an improvement over other known receptacles. The receptacle, by using part of the bottle itself, ensures that back 28, as shown in FIG. 2, may remain open and this eliminates the need for an inner wall. A receptacle so formed requires fewer parts and less material, thereby lowering manufacturing costs.

Also, by keeping back 28 open, this further enhance the adjustability of the bottom 34 and outer wall member 26 of the receptacle 11 for matching varying curvatures of a given bottle, or other round product, with that of the receptacle.

The receptacle, with its arc-shaped outer wall member 26, provides a structure that maximizing pocket space while remaining streamline with the round product. This provides the advantage increasing the number and variety of objects that may be disposed within the receptacle while, at the same time, because the receptacle is streamline, promoting efficient storing and stacking of the receptacle with bottle on a shelf. Put another way, the receptacle 11, with its arc-shaped outer wall member 26 and spaced-apart radially extending ends 30 and 32, provides the synergy of both maximizing storage space within the receptacle while remaining relatively streamline to maximize shelf-space. This in turn may represent shelf-space savings for the vendor.

The streamline nature of the receptacle as herein described may also reduce the occurrences of the receptacle banging into other adjacent products, and thus may inhibit damage to adjacent products and inhibit damage to the receptacle itself.

The use of flanges for adhering the receptacle to the bottle may act to reduce the adhesive surface area required and thus amount of adhesive required compared to other receptacles. By reducing the adhesive surface area this may inhibit the amount of potential damage to the bottle 12 that otherwise may occur via adhesive application. This may be particularly true where the receptacle is removed and re-applied to the bottle numerous times.

Figure 9:
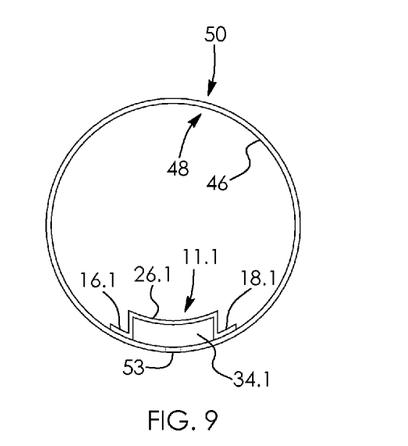
FIG. 9 is a top plan view of the receptacle shown in FIG. 6 as attached to a concave, inner surface of a container.
Figure 10:
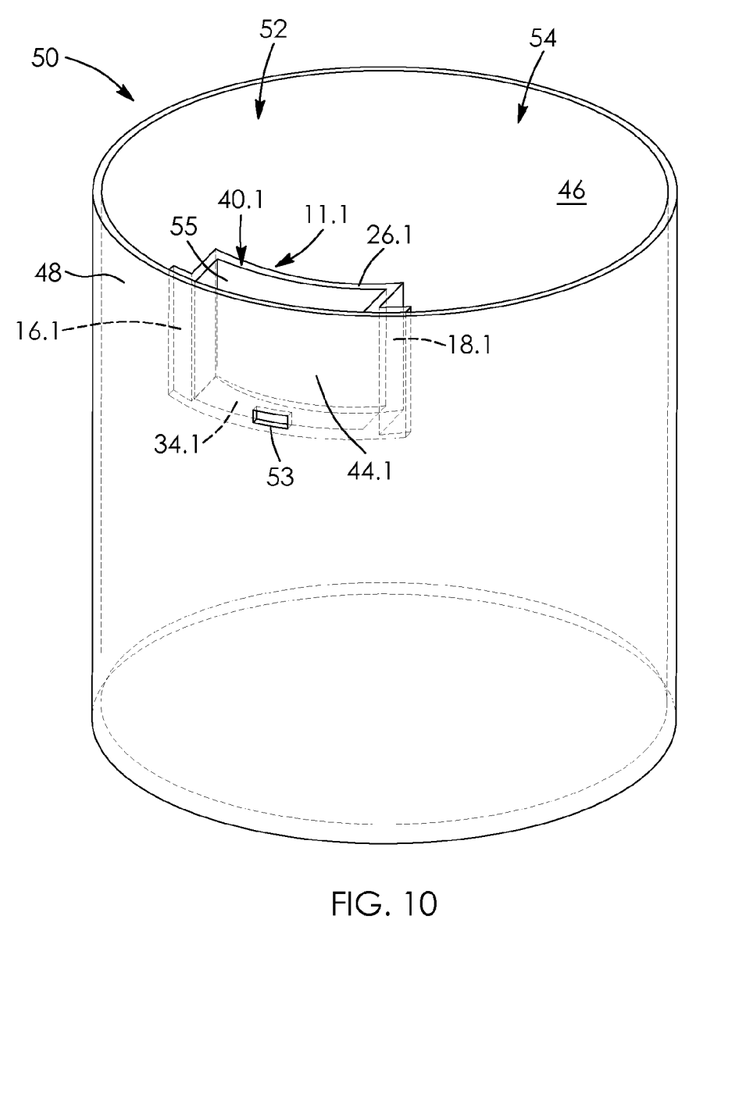
FIG. 10 is a top, side perspective view of the receptacle shown in FIG. 9, the receptacle being partially shown in ghost, together with the container shown in FIG. 9.

FIGS. 6 to 10 show a receptacle 11.1 according to another embodiment. Like parts have like numbers and function as the embodiment shown in FIGS. 1 to 5 with the addition of "0.1". Receptacle 11.1 is substantially the same as receptacle 11 shown in FIGS. 1 to 5 with one exception being that receptacle 11.1 is configured to attach to a concave surface, in this example, inner surface 46 of a curved wall 48 of a container 50 as shown in FIGS. 9 and 10. Container 50 in this example has a generally cylindrical shape and an opening 52. The outer wall member 26.1 and the outer edge 36.1 and inner edge 38.1 of the bottom 34.1, all shown in FIG. 6, have curvatures that match the curvature of the inner surface 46 of the curved wall 48 of the container 50.

As shown in FIGS. 9 and 10, the container 50 includes a drain hole 53 extending through portion 44.1 of the curved wall 48. The drain hole 53 is in communication with interior 55 of the receptacle. The receptacle is preferably positioned such that drain hole 53 is aligned slightly above bottom 34.1 of the receptacle.

The receptacle 11.1 so configured is relatively streamlined within interior 54 of the container 50 and thus ensures that a relatively large amount of the interior 54 is still available for the container to receive other separated objects.

The receptacles as herein described may be used as part of a delivery vehicle or mechanism or a marketing package where only the purchasing customer may look at what is within the receptacle or "mystery package". This is particularly true for receptacle 11.1, which is advantageously disposed within interior 54 of the container. For the receptacle 11 shown in FIGS. 1 to 5, outer wall mount 26 is preferably opaque or frosted to inhibit non-customers from viewing the interior contents of the receptacle 11.

Figure 11:
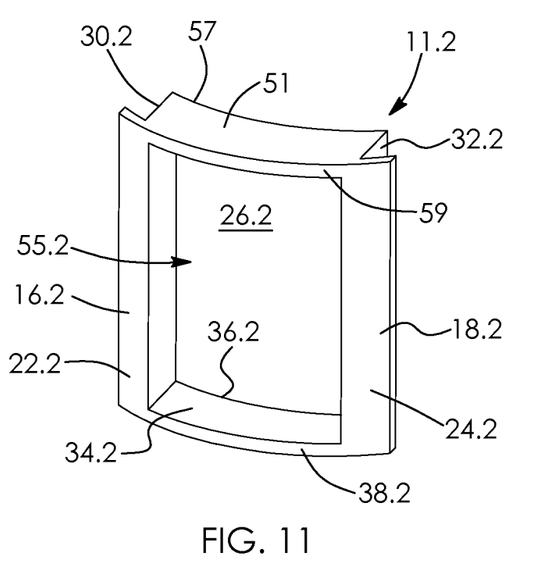
FIG. 11 is a top, rear perspective view of a receptacle according to another embodiment.
Figure 12:
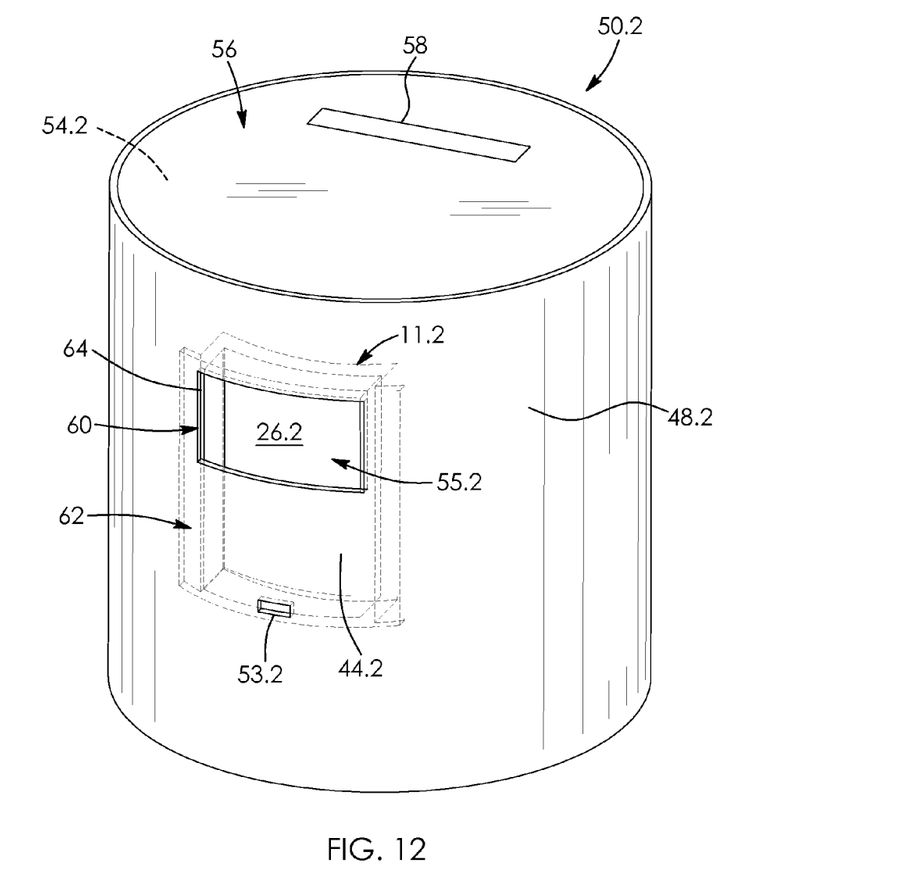
FIG. 12 is a top, side perspective view of the receptacle shown in FIG. 11, the receptacle being partially shown in ghost, together with a container according to another embodiment.

FIGS. 11 to 12 show a receptacle 11.2 and a container 50.2 according to a further embodiment. Like parts have like numbers and function as the embodiment shown in FIGS. 6 to 10 with decimal extension "0.2" replacing decimal extension "0.1" and being added to numerals not previously having a decimal extension.

Figure 6:
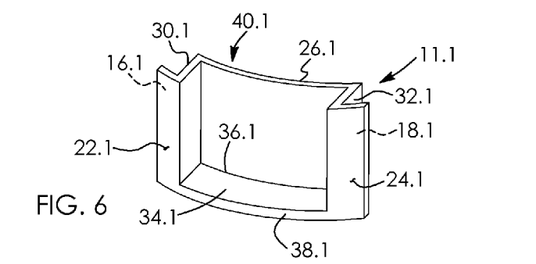
FIG. 6 is a top, rear perspective view of a receptacle according to a further embodiment.
Figure 7:
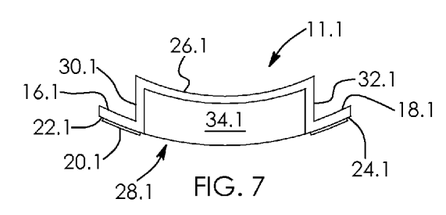
FIG. 7 is a top plan view of the receptacle shown in FIG. 6.
Figure 8:
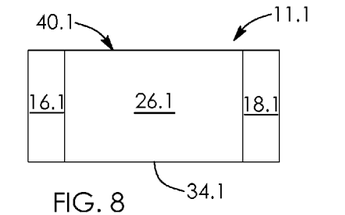
FIG. 8 is a front elevation view of the receptacle shown in FIG. 6.

Receptacle 11.2 is substantially the same as the receptacle shown in FIG. 6 with two exceptions. First, receptacle 11.2 is generally twice as long as receptacle 11: flanges 16.2 and 18.2, ends 30.2 and 32.2, and outer wall member 26.2 are each double in size relative to their counterparts shown in FIG. 6. Also, receptacle 11.2 includes a closed top 51 connecting to and extending between ends 30.2 and 32.2. Top 51 also connects to and extends from outer wall member 26.2. Interior 55.2 of the receptacle is thus enclosed by ends 30.2 and 32.2, outer wall member 26.2, bottom 34.2 and top 51.

Top 51 includes a curved, outer edge 57 that connects to and extends in parallel with the outer wall member 26.2 and which is parallel with outer edge 36.2 of the bottom 34.2. Top 51 also includes a curved, inner edge 59 configured to abut with and partially extend about the container 50.2 shown in FIG. 12. Inner edge 59 of the top 51 extends in parallel with inner edge 38.2 of the bottom 34.2. According to one preferred embodiment, outer edges 59 and 38.2, inner edges 57 and 36.2, and the outer wall member 26.2 have curvatures that match the curvature of the curved wall 48.2

As shown in FIG. 12, container 50.2 includes a closed top 56 covering its interior 54.2. The top 56 has a slot 58 extending therethrough. The container 50.2 may receive information within its interior via the slot 58.

Portion 44.2 of the curved wall 48.2 opposite the outer wall member 26.2 of the receptacle has an upper half 60 and a lower half 62 adjacent thereto. The upper half 60 and lower half 62 are generally in the form of curved rectangular walls. The upper half 60 of said portion 44.2 of the curved wall includes an opening 64 that is generally rectangular in shape in this example. Opening 64 is in communication with and permits access to interior 55.2 of the receptacle 11.2. The lower half 62 of said portion 44.2 of the curved wall includes drain hole 53.2. The lower half 62 remains integral with the curved wall 48.2. The lower half 62 of said portion 44.2 of the curved wall is thus configured retain an object, such as a mystery package, disposed within the receptacle.

The receptacle 11.2 may thus deliver information via opening 64, such as an object in the form of a mystery package, for a purchasing customer, access to which is restricted by top 51.

It will be appreciated that many further variations are possible within the scope of the invention described herein. For example, the receptacle may be integrally connected to the product or container, and may be made by blow moulding. The blow-moulded container may be made of plastic, or glass.

Blow-moulding per se is well known to those skilled in the art, as is for example disclosed in a search for "blow molding" at Wikipedia in the following link http://en.wikipedia.org/wiki/Blow_molding, the disclosure of which is incorporated herein by reference. An extruder presses molten material such as plastic or glass, through a blow pin via pressurized air and into a split mould. The split mould preferably is configured with a contoured surface that is a mirror image of the container 50.2 and receptacle 11.2 shown in FIG. 12 minus portion 44.2. The mould has a protrusion extending inwards that is the mirror image of the outer wall member 26.2, bottom 34.2, top 51, and ends 30.2 and 32.2. The protrusion is thus shaped to form an indentation generally in the shape of and in the position of the receptacle 11.2 shown in FIG. 11, minus the flanges 16.2 and 18.2. The method includes disposing the material via pressurized air into the contoured surface of the mould. The material forms the container including the indentation. Next, a receptacle is formed for the container by connecting a portion of material, of similar size as portion 44.2 as shown in FIG. 12, across at least part of the indentation. The last step in the method is to let the material cool.

Alternatively the integrated container may be made, for example, by pressed steel or tin.

It will be understood by someone skilled in the art that many of the details provided above are by way of example only and are not intended to limit the scope of the invention which is to be determined with reference to the following claims.

What is claimed is:

1. A container assembly comprising:
 a container comprising:
  a closed bottom and
  a curved exterior sidewall having an outer surface; and,
 a receptacle connecting to the outer surface of the curved exterior sidewall of said container, the receptacle comprising:
  a pair of spaced-apart arcuate flanges configured to partially extend about the container;
  a closed arcuate elongate wall outwardly spaced from and partially covering a portion of the outer surface of the curved exterior sidewall of the container;
  an open back opposite the closed arcuate elongate wall member of the receptacle, the open back aligning with said portion of the outer surface of the curved exterior sidewall of the container, said portion effectively forming part of the receptacle;
  a pair of spaced-apart planar ends extending outwards from said portion of the outer surface of the curved exterior sidewall of the container, the ends of the receptacle connecting the flanges to the closed arcuate elongate wall, the flanges of the receptacle extending outwards from the ends of the receptacle;
  an open top for receiving an object, the open top being in communication with the open back of the receptacle, the open top extending between the ends of the receptacle and extending between the portion of the outer surface of the curved exterior sidewall and the closed arcuate elongate wall of the receptacle;
  a bottom connecting to and extending between the ends of the receptacle, the bottom of the receptacle being spaced-apart from the open top of the receptacle, the bottom of the receptacle being arc-shaped with a curved outer edge connecting to the closed arcuate elongate wall of the receptacle, and a curved inner edge spaced-apart from and extending in parallel with the curved outer edge, the curved inner edge of the bottom of the receptacle being configured to abut with and partially extend about the container; and
  a drain slot extending through the bottom of the receptacle and proximate the closed arcuate elongate wall, the drain hole being configured to enable water entering the receptacle to drain.

2. The container assembly as claimed in claim 1, wherein the curved exterior sidewall has a convex surface, the receptacle is configured to connect to the convex surface via the flanges, the curved inner edge of the bottom of the receptacle is configured to abut with and partially extend about the convex surface, the closed arcuate elongate wall is disposed to face the convex surface and partially extends in parallel with the convex surface, a portion of the convex surface aligned opposite the closed arcuate elongate wall forms a part of the receptacle, and the object disposed within the receptacle is retainable by the bottom of the receptacle, the ends of the receptacle, the closed arcuate elongate wall of the receptacle and said portion of the convex surface of the curved exterior sidewall of the container.

3. The container assembly as claimed in claim 1, wherein the curved exterior sidewall has a concave surface, the receptacle is configured to connect to the concave surface via the flanges, the curved inner edge of the bottom of the receptacle is configured to abut with and partially extend about the concave surface, the closed arcuate elongate wall is disposed to face the concave surface and partially extends in parallel with the concave surface, a portion of the concave surface aligned opposite the closed arcuate elongate wall forms a part of the receptacle, and the object disposed within the receptacle is retainable by the bottom of the receptacle, the ends of the receptacle, the closed arcuate elongate wall of the receptacle and said portion of the concave surface of the curved exterior sidewall of the container.

4. The container assembly as claimed in claim 1, further including adhesive disposed on the flanges so as to enable the flanges to selectively adhere to the container.

5. The container assembly as claimed in claim 1, wherein the pair of spaced-apart ends of the receptacle radially extend from the curved exterior sidewall of the container.

6. The container assembly as claimed in claim 1, wherein the container and the receptacle are formed by blow-molding.

7. The container assembly as claimed in claim 1, wherein the receptacle is integrally formed with the container.

8. The container assembly as claimed in claim 1, and an object selectively insertable within the receptacle of the container assembly, the object being a mystery package.

9. The container assembly as claimed in claim 1, and an object selectively insertable within the receptacle of the container assembly, the object being a marketing package.

\* \* \* \* \*